United States Patent [19]

Hunt et al.

[11] 4,270,169

[45] May 26, 1981

[54] ARRAY PROCESSOR

[75] Inventors: David J. Hunt, Hitchin; Stewart F. Reddaway, Baldock, both of England

[73] Assignee: International Computers Limited, London, England

[21] Appl. No.: 20,802

[22] Filed: Mar. 15, 1979

[30] Foreign Application Priority Data

May 3, 1978 [GB] United Kingdom ............... 17404/78

[51] Int. Cl.³ .............................................. G06F 15/16
[52] U.S. Cl. .................................................... 364/200
[58] Field of Search ... 364/200 MS File, 900 MS File

[56] References Cited

U.S. PATENT DOCUMENTS

| 3,287,702 | 11/1966 | Borck, Jr. et al. | 364/200 |
|---|---|---|---|
| 3,287,703 | 11/1966 | Slotnick | 364/200 |
| 3,296,426 | 1/1967 | Ball | 364/200 |
| 3,308,436 | 3/1967 | Borck, Jr. et al. | 364/200 |
| 3,312,943 | 4/1967 | McKindles et al. | 364/200 |
| 3,364,472 | 1/1968 | Sloper | 364/200 |
| 3,473,160 | 10/1969 | Wahlstrom | 364/900 |
| 3,537,074 | 10/1970 | Stokes et al. | 364/200 |
| 3,544,973 | 12/1970 | Borck, Jr. et al. | 364/200 |
| 3,582,899 | 6/1971 | Semmelhaack | 364/200 |
| 3,815,095 | 6/1974 | Wester | 364/200 |
| 3,936,806 | 2/1976 | Batcher | 364/200 |
| 3,970,993 | 7/1976 | Finnila | 364/200 |
| 3,979,728 | 9/1976 | Reddaway | 364/200 |
| 4,065,808 | 12/1977 | Schomberg et al. | 364/200 |
| 4,174,514 | 11/1979 | Sternberg | 364/200 |

*Primary Examiner*—James D. Thomas
*Assistant Examiner*—Eddie P. Chan
*Attorney, Agent, or Firm*—Hane, Roberts, Spiecens & Cohen

[57] ABSTRACT

An array processor is described consisting of a plurality of modules connected together in rows and columns. Each module has at least one special terminal which, as well as providing a connection for transfer of data between adjacent modules, also provides an output which is combined with similar signals from the other modules in the same row, to form a row response signal. Alternate modules in each row are rotated by 180° with respect to each other, so that the special terminals on adjacent modules are connected in pairs. This reduces the complexity of the circuits for forming the row response signals.

2 Claims, 8 Drawing Figures

ARRAY PROCESSOR

BACKGROUND OF THE INVENTION

This invention relates to array processors.

An array processor is defined herein as a data processing system comprising a plurality of processing elements which are operable in parallel upon separate data streams under the control of a common stream of control signals. Thus, all the elements perform basically the same sequence of operations (subject to possible modifications by activity bits within the individual elements or by control signals which are specific to particular groups of elements), but on different data. With such a processor, as many operations can be performed simultaneously as there are elements, and hence the data throughput can be very high.

Such a processor may be formed out of a plurality of identical modules, each module including one or more of said processing elements. Each module has a plurality of terminals and the modules may for example be connected together in rows and columns by means of data paths between these terminals, so as to permit transfer of data between adjacent modules. At least one of these terminals may also serve to provide an output signal which is combined (e.g. ANDed or ORed) with other signals from the same row (or column) to provide a row (or column) response signal.

Such a system is described, for example, in our British Patent Specification No. 1,445,714 published Aug. 11, 1976 and in our co-pending British Patent Application No. 10873/76 filed Mar. 18, 1976, now British Patent No. 1,536,933 published Dec. 29, 1978.

It is clear that, if the array contains a large number of modules, a large number of AND/OR gates and data paths is necessary to form the response signals. One object of the present invention is to reduce the number of such gates and data paths.

SUMMARY OF THE INVENTION

According to the invention, there is provided an array processor comprising a plurality of identical modules, each module including one or more processing elements and each module having a plurality of terminals, the modules being connected together in rows and columns by means of data paths between said terminals to permit transfer of data between adjacent modules in each row or column, wherein at least one of the terminals on each module also serves to provide an output signal which is combined together with similar signals from the other modules in the same row to provide a response signal for that row, and wherein modules in alternate columns are rotated by 180° so that in pairs of columns the terminals which provide said output signals are connected together by said data paths so as to form a wired AND (OR) combination of said signals, thereby reducing the number of further connections needed to form said row response signals.

BRIEF DESCRIPTION OF THE DRAWINGS

One array processor in accordance with the invention will now be described by way of example with reference to the accompanying drawings, of which.

DESCRIPTION OF THE PREFERRED EMBODIMENT

Figure 1:
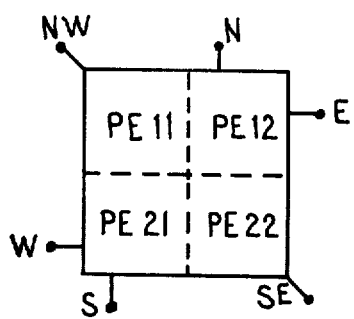
FIG. 1 shows an LSI chip implementing a sub-array of processing elements.

FIG. 1 shows an LSI chip which contains four processing elements PE11, PE12, PE21 and PE22, arranged in a 2×2 sub-array. In the completed array processor, each element is connected to its four nearest neighbours in the north, east, south and west directions. Connections between elements on the same chip (such as between PE11 and PE12) are of course formed by means of internal connections within the chip itself. However, connections to elements on other chips must be made by way of external pins on the chip.

At first sight, it would appear that eight pins are required for this purpose: two from each of the elements on the chip. However, in the embodiment described here, only six pins (designated N, E, SE, S, W and NW) are provided on each chip for this purpose. Thus, there is a reduction of two pins on each chip, which is a significant and worthwhile saving.

It will be appreciated, of course, that each chip will have several other pins in addition to those shown in FIG. 1, for power input, control codes and so on.

Figure 2:
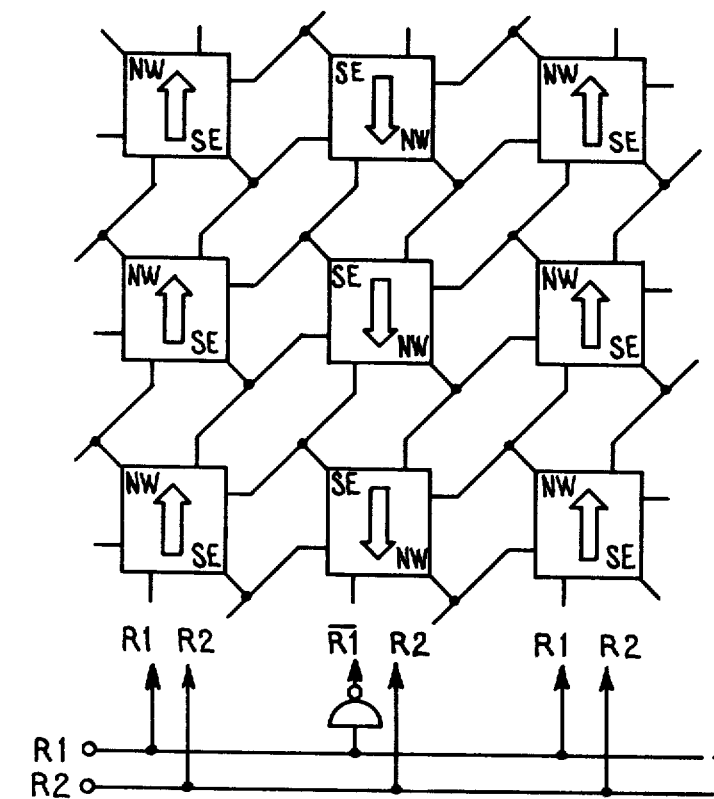
FIG. 2 shows the way in which the LSI chips are connected to form the array processor.

Referring to FIG. 2, a large number of chips such as shown in FIG. 1 are connected together in a two-dimensional rectangular array. All the chips are identical. However, as shown, the chips in alternate columns are rotated through 180° so that for the chips in the even-numbered columns the N pin actually points "south". The reason for this will be explained later. Each "diagonal" pin (NW or SE) is connected to the nearest non-diagonal pin on each of the two neighbouring chips nearest that diagonal pin. Thus, it can be seen that the connections to these diagonal pins have three branches.

FIG. 2 also shows the way in which a routing code is broadcast to all the chips. This code consists of two bits R1, R2 the meaning of which is as follows:

| R1 | R2 | Direction |
|---|---|---|
| 0 | 0 | North |
| 0 | 1 | East |
| 1 | 0 | South |
| 1 | 1 | West |

As shown in FIG. 2, the bit R1 is inverted for the even-numbered columns. This takes account of the fact that the chips in these columns are rotated by 180°.

Figure 3:
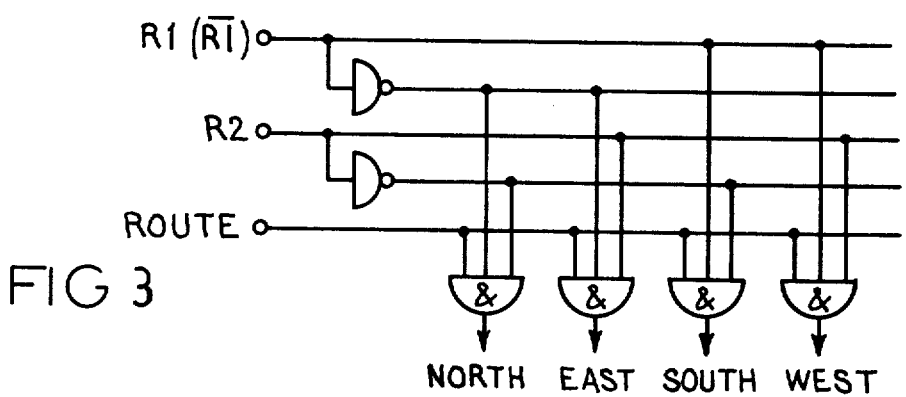
FIG. 3 shows a decoding circuit on each chip.

Referring to FIG. 3, this shows a decode circuit which is incorporated on each chip. This circuit decodes the routing code R1, R2 (R1, R2 in the case of the even-numbered columns) to produce a binary "1" on the appropriate one of four control lines NORTH, EAST, SOUTH and WEST. The decoder also receives a control signal ROUTE. When ROUTE=1 the decoder is enabled, but when ROUTE=0 it is disabled and all four control lines are held at "0".

FIGS. 4-7 show the four processing elements PE11-PE22 on the chip, and the gating which controls the connection between these elements and the pins N, E, SE, S, W and NW. (The internal structure of each processing element forms no part of the present invention, and it will not be described further in this specification.

It may, however, be similar to that described in our British Patent Specification No. 1,445,714 or in our co-pending British Patent Application No. 10873/76). Each processing element has two outputs A and B. Output A produces data for routing to neighbouring elements, while output B produces data for forming row response signals which will be described later. (In some forms of the invention a single output may serve both these functions).

Figure 4:
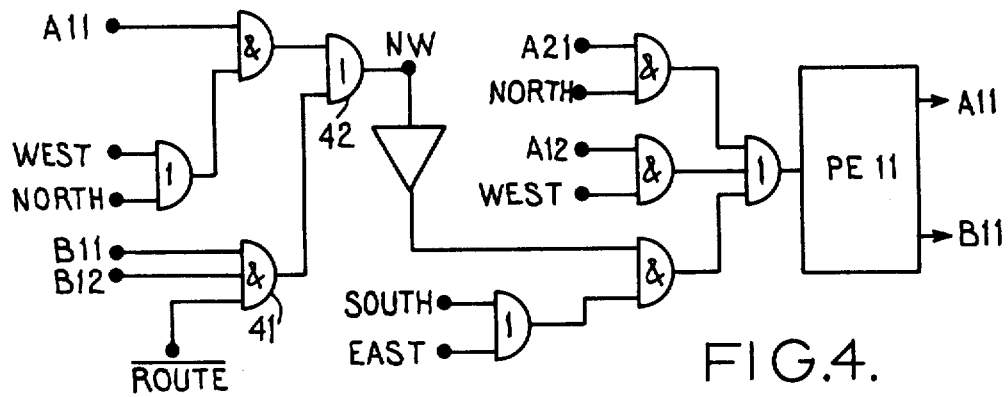
FIGS. 4-7 show various gating circuits on the chip.

Referring now to FIG. 4, the input to the processing element PE11 is selected from one of three sources.
  (a) When NORTH=1, the output A21 from processing element PE21 is selected.
  (b) When WEST=1, the output A12 from element PE12 is selected.
  (c) When SOUTH=1 or EAST=1, the input from the NW pin is selected.

In addition, when WEST=1 or NORTH=1, the output A11 from the element PE11 is applied to the pin NW, for routing to the elements on neighbouring chips.

Figure 5:
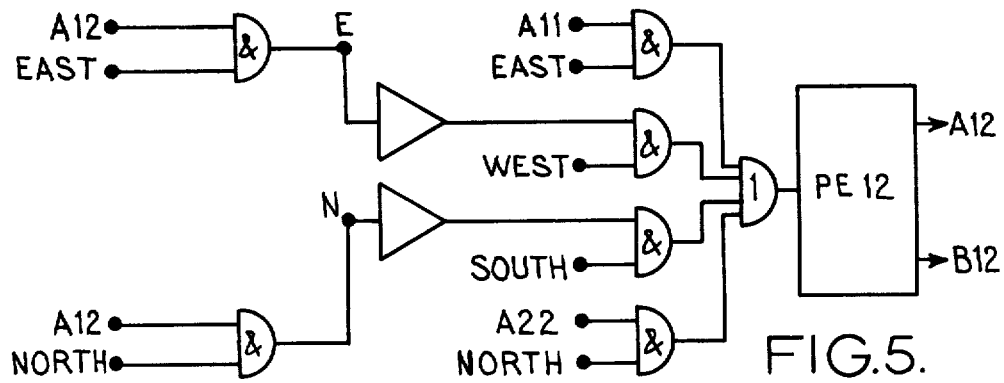
Figure 6:
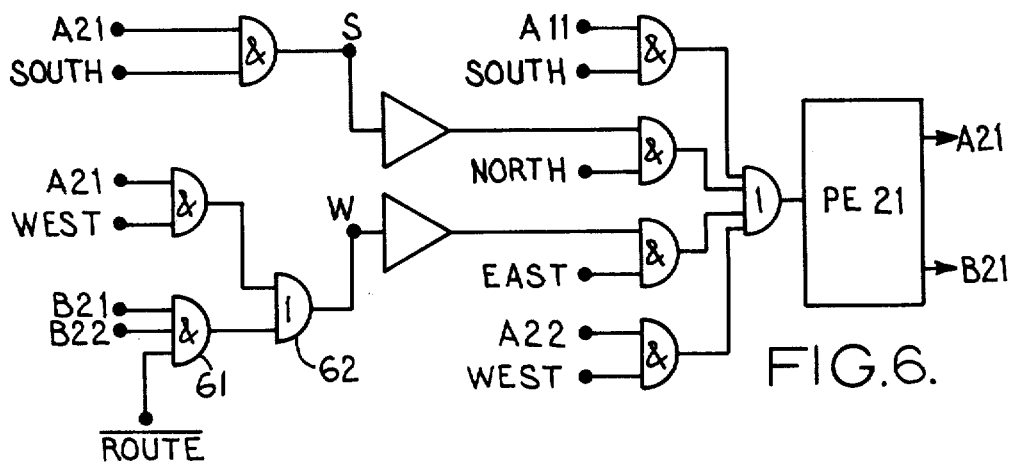
Figure 7:
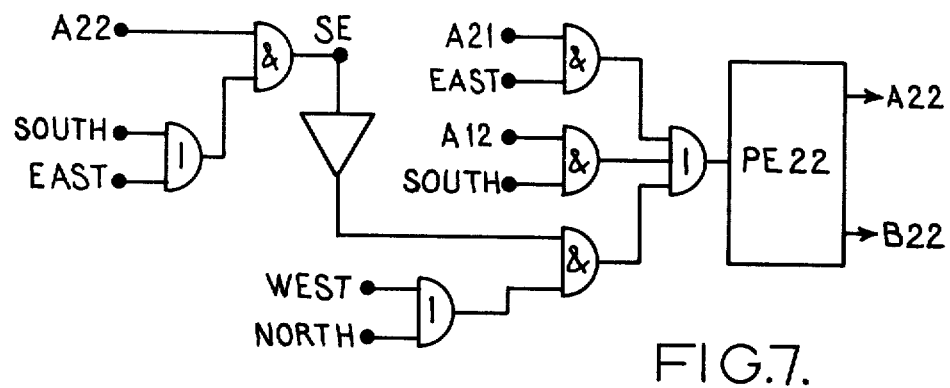

The gating circuits for the other elements PE12, PE21 and PE22 are shown in FIGS. 5-7 and are very similar to those shown in FIG. 4. It is therefore not necessary to describe these Figures in detail. It can be seen that the circuits shown in FIGS. 4-7 ensure that data is routed in the correct direction between neighbouring processing elements, according to the value of the direction code. For example, if the direction code R1, R2 is (0,0) the output A of each element will be routed to the input of its northern neighbour. It can also be seen that for each three-branched connection, at any given time, only one branch is allowed to send data, and only one is allowed to receive data, the third branch being disabled and hence unable to send or receive.

Instead of routing data between adjacent elements, it may be desired to produce a set of row response signals, one for each row. Each such response signal consists of the AND function of the outputs B from all the processing elements in the row in question. This mode of operation is selected by setting ROUTE=0.

Referring to FIG. 4, when ROUTE=0, an AND gate 41 is enabled, permitting the AND function of the outputs B11 and B12 from processing elements PE11 and PE12 to be applied by way of OR gate 42 to the NW pin. Similarly, as shown in FIG. 6, when ROUTE=0, an AND gate 61 is enabled, permitting the AND functions of the outputs B21 and B22 to be applied by way of OR gate 62 to the W pin. Thus, the AND function of the outputs of the two elements PE11 and PE12 in the upper row of the 2×2 sub-array apears on the NW pin, while the AND function of the outputs of the two elements PE21, PE22 in the lower row of the sub-array appears on the W pin.

Figure 8:
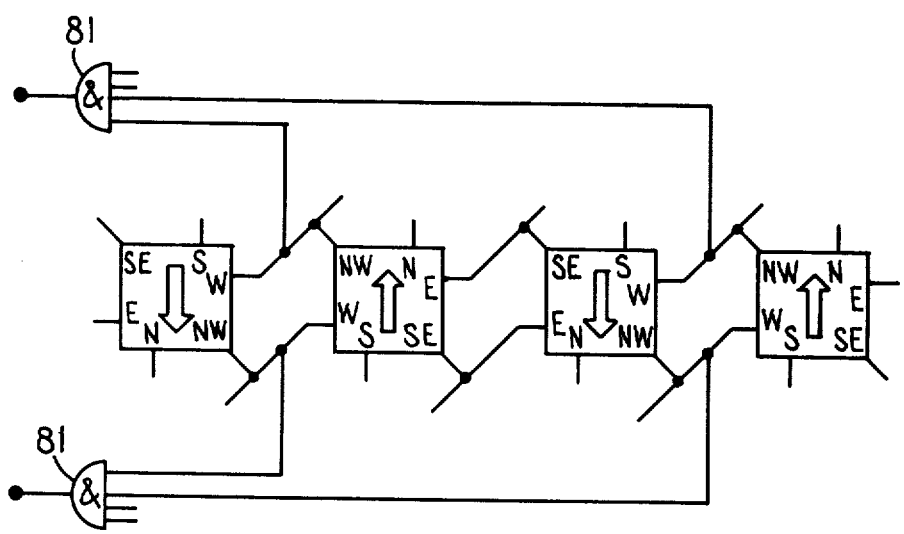
FIG. 8 shows the way in which row response signals are derived from the array.

Referring now to FIG. 8, this shows one row of chips, and the way in which their row response signals are formed. It can be seen that, because the chips in alternate columns are rotated through 180°, the response pins NW and W of elements in adjacent rows are already connected together by means of the data paths which are used for routing data between elements. The signal which appears on each such path is the wired AND function of the output of the two response pins to which it is connected, and is thus the AND function of the B outputs from four processing elements. (The outputs from the circuits are assumed to be of the "open collector" type, so as to make such wired logic possible.)

As shown in this figure, these AND functions from each row are all combined together in AND circuits 81, one for each row, so as to produce the row response signals as required.

The reason for the 180° rotation of the chips in alternate rows can now be appreciated: this feature permits the AND combination of four elements in a row to be formed without any extra wiring external to the chip, and thus reduces the number of inputs to the AND circuits 81. It is found that the reduction in complexity in the AND circuits more than compensates for the additional inverters (FIG. 2) which are necessitated by the 180° rotation.

Reference is made to our co-pending British Patent application No. 17403/78 filed May 3, 1978, now British Patent Specification No. 2,020,457, published Nov. 11, 1979, in which features of the system described above are claimed.

What is claimed is:
1. An array processor comprising
  (a) a plurality of identical processing modules in rows and columns to form a two-dimensional rectangular array;
  (b) each module having a first set of terminals along a first edge of said module and a second set of terminals along a second edge of said module, said second edge being parallel to said first edge, said second set of terminals transferring signals which are functionally different from the signal transferred by said first set;
  (c) each module comprising means for producing response signals and means for coupling said response signals internally of the module to terminals of said first set of terminals;
  (d) the modules of alternate columns being rotated 180° with respect to each other so that the first sets of terminals of adjacent modules in the same row are opposite each other and also the second sets of terminals of adjacent modules in same row are opposite each other;
  (e) the mutually opposite terminals being connected together;
  (f) a plurality of gates; and
  (g) means for connecting each gate to a plurality of the interconnected mutually opposite pairs of terminals of the first sets of terminal whereby the outputs of the gates are the overall response signals.

2. An array processor according to claim 1 comprising means for receiving a routing code specifying a direction in which data is to be transferred between the first and second sets of terminals of adjacent modules in the array, means for transmitting said routing code to alternate columns of the array without modification, and means for modifying said routing code so as to reverse the direction specified thereby and for transmitting the modified code to the remaining columns of the array.

* * * * *